(12) United States Patent
Suzuki

(10) Patent No.: US 10,220,907 B2
(45) Date of Patent: Mar. 5, 2019

(54) SADDLE-RIDDEN TYPE VEHICLE

(71) Applicant: SUZUKI MOTOR CORPORATION, Hamamatsu-shi, Shizuoka (JP)

(72) Inventor: Ichiro Suzuki, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 123 days.

(21) Appl. No.: 15/426,528

(22) Filed: Feb. 7, 2017

(65) Prior Publication Data

US 2017/0233033 A1    Aug. 17, 2017

(30) Foreign Application Priority Data

Feb. 15, 2016  (JP) .................................. 2016-025494

(51) Int. Cl.
  *B62K 25/28*  (2006.01)
  *B62M 7/02*  (2006.01)
  *B62K 11/04*  (2006.01)

(52) U.S. Cl.
  CPC ............ *B62K 25/283* (2013.01); *B62K 11/04* (2013.01); *B62K 25/286* (2013.01); *B62M 7/02* (2013.01)

(58) Field of Classification Search
  CPC .... B62K 25/283; B62K 25/286; B62K 11/04; B62M 7/02
  USPC ......................................................... 180/227
  See application file for complete search history.

(56) References Cited

U.S. PATENT DOCUMENTS

| | | | | |
|---|---|---|---|---|
| 4,506,755 A | * | 3/1985 | Tsuchida | B62K 25/286 180/227 |
| 4,515,236 A | * | 5/1985 | Kanamori | B62K 25/286 180/227 |
| 4,574,909 A | * | 3/1986 | Ribi | B62K 25/286 180/227 |
| 4,673,053 A | * | 6/1987 | Tanaka | B62K 25/286 180/227 |
| 4,753,314 A | * | 6/1988 | Tsukiji | B62K 25/286 180/227 |
| 4,781,264 A | * | 11/1988 | Matsuzaki | B62K 11/04 180/219 |
| 7,547,030 B2 | * | 6/2009 | Toyoda | B62K 25/283 180/227 |

(Continued)

FOREIGN PATENT DOCUMENTS

| | | | | |
|---|---|---|---|---|
| EP | 2848512 | * | 3/2015 | ............ B62K 11/04 |
| JP | 2006-347472 A | | 12/2006 | |
| JP | 2011-79343 A | | 4/2011 | |

*Primary Examiner* — Anne Marie M Boehler
(74) *Attorney, Agent, or Firm* — Stein IP, LLC

(57) ABSTRACT

There is provided a saddle-ridden type vehicle. The vehicle includes frame members, pivot shaft supports, a swing arm, first and second support members, a rear cushion unit and a link mechanism. A first link member has one end portion pivotably connected to a rear end portion of the rear cushion unit, the other end portion located at a front lower side relative to the rear end portion and extending to a position at a rear side relative to a rear end portion of each frame member, and a swing arm connection unit. A second link member has one end portion pivotably connected to the other end portion of the first link member and the other end portion pivotably connected to the second support member. A cushion unit connection portion of the swing arm is pivotably connected to a swing arm connection portion of the first link member.

4 Claims, 6 Drawing Sheets

(56) References Cited

U.S. PATENT DOCUMENTS

| | | | | |
|---|---|---|---|---|
| 8,893,842 B2* | 11/2014 | Mori | ............... | F16F 9/065 180/227 |
| 2010/0243365 A1* | 9/2010 | Mori | ............... | B60K 5/04 180/292 |
| 2011/0079458 A1 | 4/2011 | Nishiyama et al. | .......... | 180/227 |

* cited by examiner

SADDLE-RIDDEN TYPE VEHICLE

CROSS-REFERENCE TO RELATED APPLICATIONS

The disclosure of Japanese Patent Application No. 2016-025494 filed on Feb. 15, 2016, including specification, drawings and claims is incorporated herein by reference in its entirety.

TECHNICAL FIELD

The present invention relates to a saddle-ridden type vehicle having a rear cushion unit between a vehicle body frame and a swing arm.

BACKGROUND

Generally, in a saddle-ridden type vehicle such as a motorcycle, a rear cushion unit is provided between a vehicle body frame and a swing arm. The rear cushion unit absorbs impact which is applied to a vehicle body through a rear wheel when the vehicle travels on a road surface having unevenness. The rear cushion unit generally includes a spring and a damper.

The following Patent Document 1 discloses a saddle-ridden type vehicle in which a rear cushion unit is arranged so as to extend in a vertical direction of a vehicle body. As shown in FIG. 2 of the Patent Document 1, an upper end portion of the rear cushion unit is connected to an upper rear side of a crankcase of an engine suspended from a vehicle body frame via a stay and a lower end portion of the rear cushion unit is connected to a lower portion on the front end side of a swing arm via a link mechanism. The upper end portion of the rear cushion unit is located above the swing arm and the lower end portion of the rear cushion unit is located below the swing arm. Further, the whole of the link mechanism is located below the swing arm.

On the other hand, the following Patent Document 2 discloses a saddle-ridden type vehicle in which a rear cushion unit is arranged so as to extend in a longitudinal direction of a vehicle body. As shown in FIG. 3 of the Patent Document 2, a front end portion of the rear cushion unit (rear suspension) is connected to a cross member bridged between a pair of right and left frame members constituting a vehicle body frame and a rear end portion of the rear cushion unit is connected to an upper portion on the front end side of a swing arm via a link mechanism. Further, the whole of the rear cushion unit is located above the swing arm. Further, the link mechanism includes a triangular suspension arm and a bar-shaped tie rod. The suspension arm is located above the swing arm. The tie rod has an upper end portion located above the swing arm and a lower end portion located below the swing arm. The lower end portion of the tie rod is attached to a lower end portion of a swing arm bracket portion which extends downwardly from a pivot shaft support (rocking shaft support) to support a front end portion of the swing arm.

Patent Document 1: Japanese Patent Application Publication No. 2006-347472A

Patent Document 2: Japanese Patent Application Publication No. 2011-79343A

In the saddle-ridden type vehicle disclosed in the Patent Document 1, the lower end portion of the rear cushion unit and the whole of the link mechanism are located below the swing arm. Accordingly, there is a problem that it is difficult to form, below the front end side of the swing arm, a large space for arranging components such as an exhaust chamber.

Further, in the saddle-ridden type vehicle disclosed in the Patent Document 2, the whole of the rear cushion unit, the whole of the suspension arm and the upper end portion of the tie rod are located above the swing arm. Therefore, it can be considered that a large space may be easily formed below the front end side of the swing arm, as compared to the saddle-ridden type vehicle disclosed in the Patent Document 1. However, in the saddle-ridden type vehicle disclosed in the Patent Document 2, the lower end portion of the tie rod is located below the swing arm. Accordingly, there is a problem that utilization of a space below the front end side of the swing arm is restricted by the presence of the lower end portion of the tie rod.

Further, in the saddle-ridden type vehicle disclosed in the Patent Document 2, the lower end portion of the tie rod is attached to the lower end portion of the swing arm bracket portion which extends downwardly from the pivot shaft support (rocking shaft support) to support the front end portion of the swing arm. As a result, for example, when a rear wheel rides over a convex portion formed on a road surface and thus the swing arm moves upward, a load is applied to the lower end portion of the swing arm bracket portion via the tie rod. Therefore, in order to counter this load, the rigidity of the swing arm bracket portion must be increased. For example, the swing arm bracket portion must be made thicker. As a result, there is a problem that the vehicle body frame becomes heavy.

SUMMARY

It is therefore an object of the present invention to provide a saddle-ridden type vehicle in which a large space that can be used for arrangement of components can be easily formed below the front end side of the swing arm. Further, another object of the present invention is to provide a saddle-ridden type vehicle which is capable of reducing the weight of the vehicle body frame while securing the rigidity of the vehicle body frame.

According to an aspect of the embodiments of the present invention, there is provided a saddle-ridden type vehicle comprising: a pair of right and left frame members each extending linearly in a longitudinal direction; a pivot shaft support located below a rear end portion of each of the frame members; a swing arm extending in the longitudinal direction and having a front end portion pivotably supported on each pivot shaft support via a pivot shaft, a rear end portion on which a rear wheel is supported, and a cushion unit connection portion located between the front end portion and the rear end portion; a first support member located at a front side relative to the rear end portion of each of the frame members and bridged between the frame members; a second support member bridged between the rear end portions of the frame members; a rear cushion unit being extendable and retractable in the longitudinal direction and having a front end portion pivotably connected to the first support member and a rear end portion located at a rear side relative to the rear end portion of each of the frame members; and a link mechanism for connecting the rear end portion of the rear cushion unit and the cushion unit connection portion of the swing arm, wherein the link mechanism comprises: a first link member which has one end portion pivotably connected to the rear end portion of the rear cushion unit, the other end portion located at a front lower side relative to the rear end portion of the rear cushion unit and extending to a position at the rear side relative to the rear end portion of each of the frame members, and a swing arm connection unit located between the one end portion and the other end portion; and a second link member which has one end portion pivotably connected to the other end portion of the first link member and the other end portion pivotably connected to the second support member, and wherein the cushion unit connection portion of the swing arm is pivotably connected to the swing arm connection portion of the first link member.

In the above aspect, the pivot shaft supports are located below the rear end portions of the pair of right and left frame members extending linearly in the longitudinal direction and the front end portion of the swing arm is supported on the pivot shaft supports via the pivot shaft. Further, the front end portion of the rear cushion unit extending in the longitudinal direction is connected to the first support member bridged between the frame members. As will be understood from such a structure, the whole of the rear cushion unit is located above the swing arm.

Further, in the link mechanism for connecting the rear end portion of the rear cushion unit and the cushion unit connection portion of the swing arm, the first link member has one end portion connected to the rear end portion of the rear cushion unit, and the other end portion located at the front lower side relative to the rear end portion of the rear cushion unit and extending to a position at the rear side of the rear end portion of each frame member. Further, the second link member has one end portion connected to the other end portion of the first link member and the other end portion connected to the second support member bridged between the rear end portions of the frame members. Here, the rear end portions of the frame members are located above the pivot shaft supports, and thus, the second support member is also located above the pivot shaft supports. Therefore, the other end portion of the second link member is located above the pivot shaft supports, i.e., located above the swing arm. Further, when the other end portion of the first link member is located above the pivot shaft supports, most of the link mechanism can be located above the swing arm. Thus, it is possible to prevent any portion of the link mechanism from protruding downward from the lower surface of the swing arm, at least in the side view of the saddle-ridden type vehicle.

In this way, the whole of the rear cushion unit can be located above the swing arm, and any portion of the link mechanism can be prevented from protruding downward from the lower surface of the swing arm, in the side view of the saddle-ridden type vehicle. Therefore, a large space that can be used for arrangement of components can be easily formed below the front end side of the swing arm.

Further, a load which occurs, foe example, when a rear wheel rides on a convex portion formed on a road surface and thus the swing arm moves upward, is applied from the swing arm to the rear cushion unit and the second link member via the first link member. Then, the load applied to the rear cushion unit is applied to each frame member via the rear cushion unit and the first support member. Further, the load applied to the second link member is applied to each frame member via the second link member and the second support member. Since all of each frame member and the rear cushion unit extend in the longitudinal direction, the load applied to each frame member via the rear cushion unit and the first support member becomes a force of pushing each frame member in its extending direction. Further, since the second link member extends in the longitudinal direction from a position at the rear side of the rear end portion of each frame member to a position between the rear end portions of the frame members, the load applied to each frame member via the second link member and the second support member also becomes a force of pushing each frame member in its extending direction. Here, since each frame member linearly extends, each frame member has high rigidity for the force of pushing each frame member in its extending direction, and thus, can sufficiently counter the load. Therefore, it is possible to fully counter the load even without increasing each frame member in size (diameter) and thickening each frame member, for example. Alternatively, it is possible to fully counter the load even without adding other member for reinforcing the frame members. Therefore, in the saddle-ridden type vehicle, it is possible to reduce the weight of the vehicle body frame while securing the rigidity of the vehicle body frame including each frame member.

In the saddle-ridden type vehicle, a connection portion between the second link member and the second support member may be located above the swing arm.

According to the above aspect of the present invention, it is possible to prevent any portion of the link mechanism from protruding downward from the lower surface of the swing arm, in the side view of the saddle-ridden type vehicle. Therefore, a large space can be formed below the front end side of the swing arm.

In the saddle-ridden type vehicle, the rear cushion unit may be provided so that an angle between an extending and retracting direction thereof and an extending direction of each of the frame members is less than 45 degrees, irrespective of a swing angle of the swing arm.

According to the above aspect of the present invention, of a force applied to each frame member via the first link member, the rear cushion unit and the first support member when the swing arm moves upward, a component force applied to each frame member in the extending direction of each frame member can be made larger than a component force applied to each frame member in a direction perpendicular to the extending direction of each frame member. That is, the load applied to each frame member when the swing arm moves upward can be concentrated in a direction of pushing each frame member in its extending direction. In this way, it is possible to counter the load even without improving the bending rigidity of each frame member. Therefore, it is possible to reduce the weight of the vehicle body frame while securing the rigidity of the vehicle body frame.

In the saddle-ridden type vehicle, the second link member may be provided so that an angle between a straight line and an extending direction of each of the frame members is less than 45 degrees, irrespective of a swing angle of the swing arm, the straight line being obtained by connecting a connection point between the first link member and the second link member and a connection point between the second link member and the second support member.

According to the above aspect of the present invention, of a force applied to each frame member via the first link member, the second link member and the second support member when the swing arm moves upward, a component force applied to each frame member in the extending direction of each frame member can be made larger than a component force applied to each frame member in a direction perpendicular to the extending direction of each frame member. That is, the load applied to each frame member when the swing arm moves upward can be concentrated in a direction of pushing each frame member in its extending direction. In this way, it is possible to counter the load even without improving the bending rigidity of each frame member. Therefore, it is possible to reduce the weight of the vehicle body frame while securing the rigidity of the vehicle body frame.

In the saddle-ridden type vehicle, bosses for suspending an engine between the frame members may be respectively provided in the rear end portions of the frame members, and the second support member may be bridged between the bosses.

In the above aspect of the present invention, the engine is suspended between the bosses provided in the rear end portions of the frame members. Therefore, a portion of the load, which is applied to each frame member via the first link member, the second link member and the second support member when the swing arm moves upward, can be received by an outer shell (e.g., crankcase) of an engine. In this way, it is possible to counter the load even without increasing the rigidity of the frame member, and thus, it is possible to reduce the weight of the frame member.

According to the present invention, a large space that can be used for arrangement of components can be easily formed below the front end side of the swing arm. Further, according to the present invention, it is possible to reduce the weight of the vehicle body frame while securing the rigidity of the vehicle body frame.

DETAILED DESCRIPTION OF THE EMBODIMENTS

Figure 1:
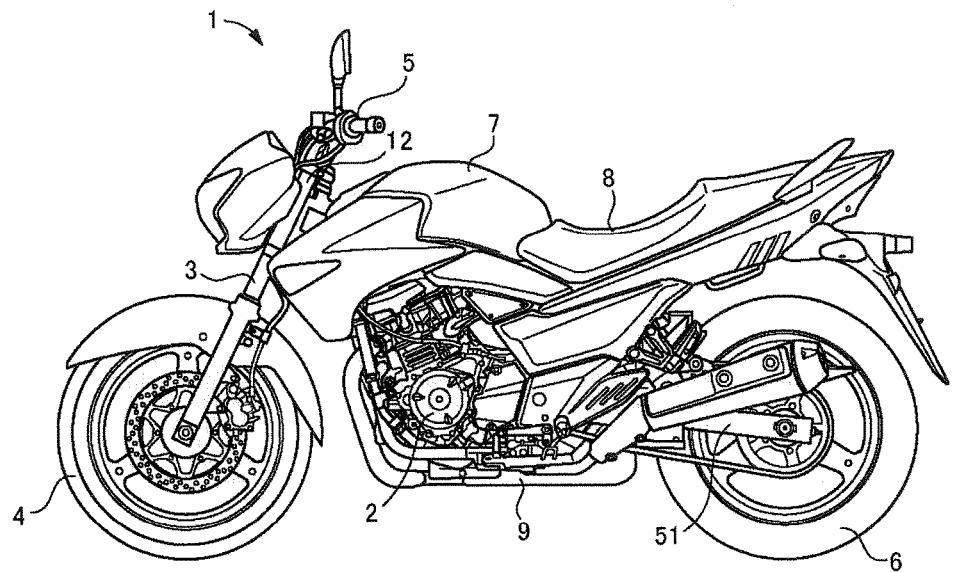
FIG. 1 is an external view showing a saddle-ridden type vehicle according to an embodiment of the present invention.

FIG. 1 shows a saddle-ridden type vehicle according to an embodiment of the present invention. Meanwhile, in the description of the embodiment of the present invention, the front, rear, upper, lower, right and left directions are defined with reference to an occupant boarding on the saddle-ridden type vehicle. In FIG. 1, a saddle-ridden type vehicle 1 according to the embodiment of the present invention is, for example, a motorcycle. The saddle-ridden type vehicle 1 includes a vehicle body frame 11 (to be described later; see FIG. 2). An engine 2 is suspended from the vehicle body frame 11. Further, a steering shaft is inserted into a head pipe 12 disposed at the front end portion of the vehicle body frame 11. The steering shaft is pivotably supported on the head pipe 12 via a bearing. Further, a front pork 3 is attached to the steering shaft via a bracket. A front wheel 4 is rotatably supported to the lower end side of the front pork 3. Further, a handle 5 is attached to the upper portion of the steering shaft via a bracket. On the other hand, the front end side of a swing arm 51 is supported on a pivot shaft support 24 (see FIG. 2) disposed on the rear portion of the vehicle body frame 11 via a bearing so as to be swingable about a pivot shaft 23 (see FIG. 2). A rear wheel 6 is rotatably supported on the rear end side of the swing arm 51. Further, a fuel tank 7 is provided above the engine 2 and a seat 8 is provided at the rear side relative to the fuel tank 7. On the other hand, an exhaust chamber 9 is provided at the lower rear side relative to the engine 2.

Figure 2:
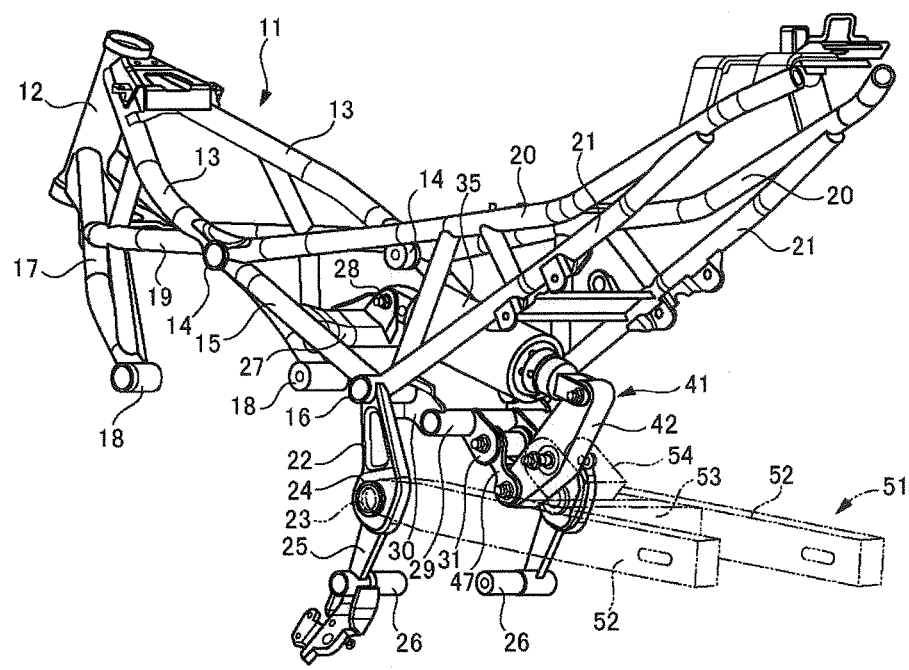
FIG. 2 is a perspective view showing a vehicle body frame, a rear cushion unit and a link mechanism or the like in the saddle-ridden type vehicle according to the embodiment of the present invention, as viewed diagonally from the rear left.
Figure 3:
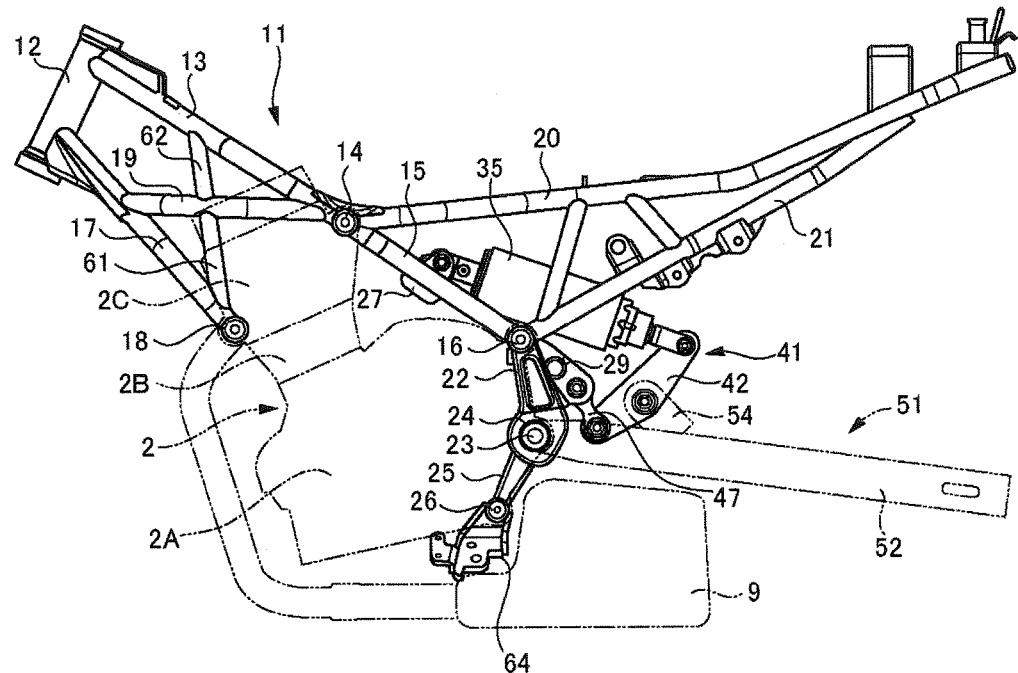
FIG. 3 is an explanatory view showing the vehicle body frame, the rear cushion unit and the link mechanism or the like in the saddle-ridden type vehicle according to the embodiment of the present invention, as viewed from the left.
Figure 4:
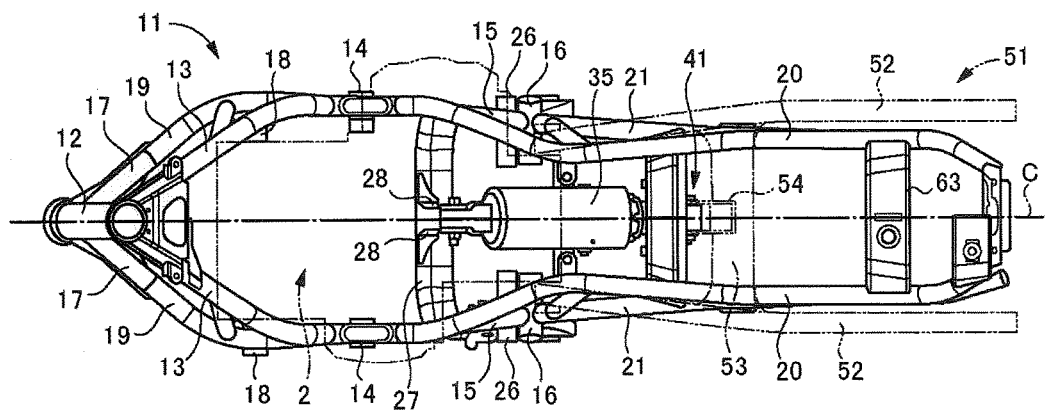
FIG. 4 is an explanatory view showing the vehicle body frame, the rear cushion unit and the link mechanism or the like in the saddle-ridden type vehicle according to the embodiment of the present invention, as viewed from above.
Figure 5:
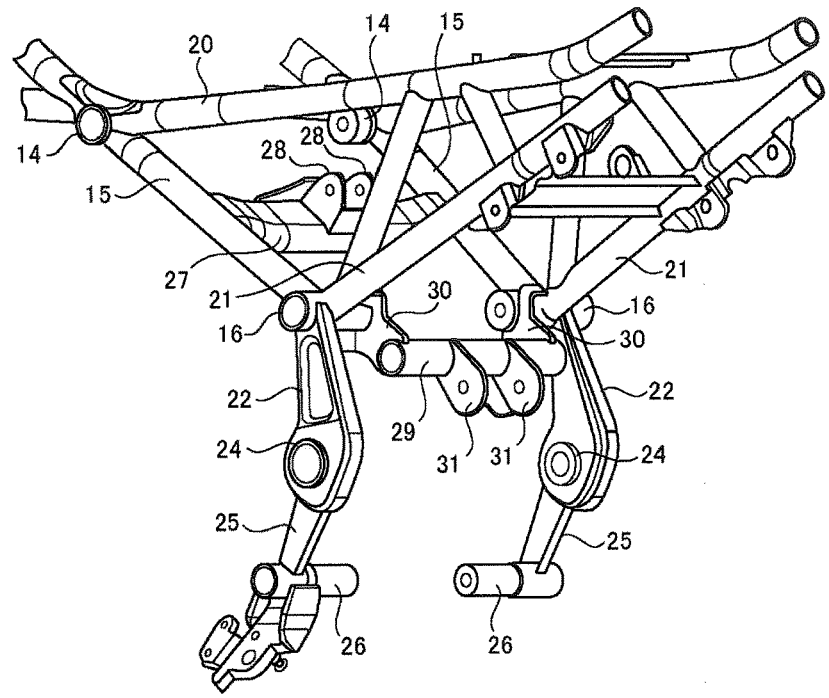
FIG. 5 is an explanatory view showing a rear tank rail, a first bridge, a second bridge and a pivot shaft support or the like in the saddle-ridden type vehicle according to the embodiment of the present invention, as viewed diagonally from the rear left.

FIGS. 2 to 4 show the vehicle body frame 11, a rear cushion unit 35 and a link mechanism 41 or the like of the saddle-ridden type vehicle 1. That is, FIG. 2 shows the vehicle body frame 11, the rear cushion unit 35 and the link mechanism 41 or the like, as viewed diagonally from the rear left. FIG. 3 shows these parts, as viewed from the left. FIG. 4 shows these parts, as viewed from above. In addition, FIG. 5 shows the portions of the vehicle body frame 11 of FIG. 2 supporting the rear cushion unit 35 and the link mechanism 41 in the state where the rear cushion unit 35 and the link mechanism 41 are removed.

The vehicle body frame 11 is configured as follows. That is, as shown in FIG. 2, the head pipe 12 is provided at an intermediate portion, in a right and left direction, of the front end portion of the vehicle body frame 11. Further, a pair of front tank rails 13 is located on the upper portion of the vehicle body frame 11 and provided at the rear side relative to the head pipe 12. Each front tank rail 13 extends in the longitudinal direction of the saddle-ridden type vehicle 1. Specifically, as shown in FIG. 3, each front tank rail 13 linearly extends from the head pipe 12 toward the rear of the saddle-ridden type vehicle 1 while being inclined downward, as seen from a side view of the saddle-ridden type vehicle 1. Further, as shown in FIG. 4, the pair of front tank rails 13 extends so as to linearly expand in a bilaterally symmetrical manner from the head pipe 12 toward the rear of the vehicle, and then, is bent at a rear end side, and then, extends in the longitudinal direction of the saddle-ridden type vehicle 1, as seen from a plan view of the saddle-ridden type vehicle 1. Further, the front end portion of each front tank rail 13 is connected to a rear surface side of the upper end portion of the head pipe 12. The front end portions of the pair of front tank rails 13 are connected to each other by a substantially triangular bracket. On the other hand, a first engine suspension boss 14 for suspending the engine 2 is provided on the rear end of each front tank rail 13.

Meanwhile, as shown in FIGS. 3 and 4, the engine 2 is fixed to the vehicle body frame 11 by a pair of first engine suspension bosses 14, a pair of second engine suspension bosses 16 (to be described later), a pair of third engine suspension bosses 18 and a pair of fourth engine suspension bosses 26. Specifically, the engine 2 has a crankcase 2A, a cylinder 2B and a cylinder head 2C. A rear side of the cylinder head 2C is arranged between the pair of first engine suspension bosses 14. The right and left sides of the rear side of the cylinder head 2C are fixed to the pair of first engine suspension bosses 14. Further, the upper rear side of the crankcase 2A is arranged between the pair of second engine suspension bosses 16 and fixed to the pair of second engine suspension bosses 16. Further, the front side of the cylinder head 2C is arranged between the pair of third engine suspension bosses 18. The right and left sides of the front side of the cylinder head 2C are fixed to the pair of third engine suspension bosses 18. Further, the lower rear side of the crankcase 2A is arranged between the pair of fourth engine suspension bosses 26 and fixed to the pair of fourth engine suspension bosses 26. Further, the engine 2 is configured such that a central portion, in the vertical direction, of the rear portion of the crankcase 2A between fixation portions of the upper rear side of the crankcase 2A and the second engine suspension bosses 16 and fixation portions of the lower rear side of the crankcase 2A and the fourth engine suspension bosses 26 is fixed to the vehicle body frame 11 by the pivot shaft support 24. The rigidity of the vehicle body frame 11 is improved by the coupling with the engine 2.

Further, a pair of rear tank rails 15 as frame members is respectively provided in the vehicle body frame 11 at the rear side relative to the pair of first engine suspension bosses 14. Each rear tank rail 15 linearly extends in the longitudinal direction of the saddle-ridden type vehicle 1. Specifically, as shown in FIG. 3, each rear tank rail 15 linearly extends from each first engine suspension boss 14 toward the rear of the saddle-ridden type vehicle 1 while being inclined downward, as seen in the side view of the saddle-ridden type vehicle 1. Further, as shown in FIG. 4, each rear tank rail 15 extends substantially in parallel with a center line C of the saddle-ridden type vehicle 1 extending in the longitudinal direction, respectively. Further, each rear tank rail 15 extends on a rearward extended line of an axis of each front tank rail 13. Namely, each rear tank rail 15 extends substantially coaxially with the rear end portion of each front tank rail 13 in an extending direction of the rear end portion of each front tank rail 13 extending parallel to a plane perpendicular to the right and left direction of the vehicle, so that the rear end portion of each front tank rail 13 is further extended. Further, the front end portion of each rear tank rail 15 is connected to each first engine suspension boss 14 and each second engine suspension boss 16 for suspending the engine 2 is provided in the rear end portion of each rear tank rail 15. That is, the front end portion of each rear tank rail 15 is connected to the rear end portion of each front tank rail 13 via each first engine suspension boss 14. More specifically, as shown in FIG. 3, the first engine suspension bosses 14 are arranged so that they can be fixed to the engine 2 within the width of the rear tank rails 15 and the width of the front tank rails 13, as seen in the side view of the saddle-ridden type vehicle 1.

Further, as shown in FIG. 3, a pair of right and left down tubes 17 is provided in the vehicle body frame 11 below the front tank rails 13 at the rear side relative to the head pipe 12. As shown in FIG. 3, the pair of right and left down tubes 17 linearly extends from the head pipe 12 toward the rear of the saddle-ridden type vehicle 1 while being inclined downwardly beyond the front tank rails 13, as seen from a side view of the saddle-ridden type vehicle 1. That is, the pair of right and left down tubes 17 is arranged so that they are spaced apart from the front tank rails 13 toward the rear side. Further, as shown in FIG. 4, the pair of down tubes 17 extends so as to linearly expand in a bilaterally symmetrical manner from the head pipe 12 toward the rear of the vehicle, and then, is bent at a rear end side, and then, extends in the longitudinal direction of the saddle-ridden type vehicle 1, as seen in the plan view of the saddle-ridden type vehicle 1. Meanwhile, the pair of down tubes 17 overlaps with side frames 19 (to be described later), as seen in the plan view of the saddle-ridden type vehicle 1. A front end portion of each down tube 17 is connected to a rear surface side of a lower end portion of the head pipe 12. The front end portions of the pair of down tubes 17 are connected to each other by a substantially triangular bracket. On the other hand, the third engine suspension boss 18 for suspending the engine 2 is respectively provided at a rear end (lower end) of each down tube 17.

Further, each side frame 19 is provided between a substantially intermediate portion, in the longitudinal direction, of each down tube 17 and each first engine suspension boss 14. Specifically, as shown in FIG. 3, each side frame 19 extends horizontally and linearly in the longitudinal direction of the saddle-ridden type vehicle 1 substantially at the same height position as a lower end of the head pipe 12, as seen in the side view of the saddle-ridden type vehicle 1. Further, as shown in FIG. 4, the pair of right and left side frames 19 extends so as to linearly expand in a bilaterally symmetrical manner from respective down tubes 17 toward the rear of the vehicle, and then, is bent at its intermediate portion, and then, extends in the longitudinal direction of the saddle-ridden type vehicle 1, as seen in the plan view of the saddle-ridden type vehicle 1. Specifically, the front ends of the pair of right and left side frames 19 are connected to respective down tubes 17 in the vicinity of a rear edge portion of a substantially triangular bracket and the rear ends of the pair of right and left side frames 19 are connected to the rear ends of respective front tank rails 13 in the vicinity of the first engine suspension bosses 14. That is, as shown in FIG. 4, each side frame 19 is arranged such that the front end portion overlaps with the upper side of the down tube 17 and the rear end portion overlaps with the lower side of the rear end portion of the front tank rail 13, as seen in the plan view of the saddle-ridden type vehicle 1.

Further, an auxiliary frame 61 for connecting the lower end portion of each down tube 17 in the vicinity of each third engine suspension boss 18 and a bent site of the intermediate portion of each side frame 19 and an auxiliary frame 62 for connecting the bent site of the intermediate portion of each side frame 19 and the intermediate portion of each front tank rail 13 are provided. As shown in FIG. 3, each auxiliary frame 61, 62 is linearly arranged substantially in the vertical direction of the vehicle via each side frame 19, as seen in the side view of the saddle-ridden type vehicle 1. That is, the pair of right and left down tubes 17 and the front tank rails 13 are connected and reinforced by the auxiliary frames 61, 62 and the side frames 19 crossing in a cross shape.

Further, an upper seat rail 20 extends substantially horizontally, as seen in the side view, from each first engine suspension boss 14 toward the rear side of the saddle-ridden type vehicle 1 and a lower seat rail 21 extends from each second engine suspension boss 16 toward the upper rear side of the saddle-ridden type vehicle 1. Further, the rear end portion of the front tank rail 13, the rear end of the side frame 19, the front end of the upper seat rail 20 and the front end of the rear tank rail 15 are collectively arranged and coupled at each first engine suspension boss 14 and its vicinity. Further, the rear end of the rear tank rail 15, the front end of the lower seat rail 21 and a pivot frame 22 (to be described later) are collectively arranged and coupled at each second engine suspension boss 16 and its vicinity. Meanwhile, the upper seat rail 20 and the lower seat rail 21 are vertically connected at rear portions thereof. The right and left upper seat rails 20 are connected to each other in the vicinity of the connected sites by a bracket 63 (see FIG. 4) bridged between the right and left upper seat rails 20.

The head pipe 12, each front tank rail 13, each rear tank rail 15, each down tube 17, each side frame 19, each upper seat rail 20 and each lower seat rail 21 are respectively formed of a pipe made of steel, for example. Further, means such as welding is used for connecting these parts and the engine suspension bosses 14, 16, 18.

Further, the pivot frames 22 are provided below the right and left second engine suspension bosses 16 in the vehicle body frame 11, respectively. Each pivot frame 22 is formed of, for example, steel. Each pivot frame 22 extends in the vertical direction and an upper end portion thereof is connected to the second engine suspension boss 16 by means such as welding. On the other hand, the pivot shaft support 24 for supporting the swing arm 51 via the pivot shaft 23 is provided in a lower end portion of each pivot frame 22. The pivot shaft support 24 is formed integrally with the pivot frame 22. Each second engine suspension boss 16 and each pivot shaft support 24 are spaced apart from each other in the vertical direction. Further, a lower bracket 25 is provided in each pivot shaft support 24. Each lower bracket 25 extends downward from the pivot shaft support 24. The fourth engine suspension boss 26 for suspending the engine 2 is provided in the lower end portion of each lower bracket 25. A bracket 64 (see FIG. 3) for mounting a side stand to hold the standing state of the saddle-ridden type vehicle 1 is provided in a lower end portion of one (e.g., left lower bracket 25) of the lower brackets 25. Meanwhile, in the embodiment of the present invention, the lower brackets 25 are configured so as to be detachably fixed to the pivot frames 22 in consideration of the assembling workability of the engine 2 to the vehicle body frame 11. However, the lower brackets 25 may be formed integrally with the pivot frames 22. By integrally forming the lower brackets 25 and the pivot frames 22, it is possible to reduce the manufacturing cost and to reduce the number of parts.

Further, as shown in FIG. 5, a first bridge 27 as a first support member is bridged between the pair of rear tank rails 15 in the vehicle body frame 11. The first bridge 27 is formed of, for example, steel. The first bridge 27 extends in the right and left direction and the right and left ends thereof are connected to the right and left rear tank rails 15 by means such as welding, respectively. Further, the first bridge 27 is disposed at the front side relative to the rear end portion of each rear tank rail 15. For example, the first bridge 27 is disposed at an intermediate position of the first engine suspension bosses 14 and the second engine suspension bosses 16. The first bridge 27 has a slightly flat shape with an elongated cross section along the extending direction of the rear tank rails 15. The first bridge 27 has improved rigidity. The right and left ends of the first bridge 27 are connected to a side surface on the center side of the rear tank rail 15 in the right and left direction of the vehicle. The first bridge 27 has a shape in which the intermediate portion in the right and left direction is bent downward relative to the right and left ends. Further, a pair of cushion connection brackets 28 for connecting the front end portion of the rear cushion unit 35 is provided in the intermediate portion, in the right and left direction, of the first bridge 27. Specifically, the cushion connection brackets 28 are provided on an upper surface of the first bridge 27 bent downward. As seen in the side view of the vehicle, the support position of the front end portion of the rear cushion unit 35 can be arranged closer to the rear tank rails 15. Each cushion connection bracket 28 is formed of, for example, steel and a base end portion thereof is fixed to an upper surface side of the first bridge 27 by means such as welding. Further, a leading end side of each cushion connection bracket 28 protrudes upward (in a direction substantially perpendicular to the rear tank rails 15) while being inclined rearward.

Further, as shown in FIG. 5, a second bridge 29 as a second support member is bridged between the rear end portions of the pair of rear tank rails 15 in the vehicle body frame 11, specifically, between the pair of second engine suspension bosses 16. The second bridge 29 is formed of, for example, steel and extends in the right and left direction. Further, the right and left ends of the second bridge 29 are connected to the right and left second engine suspension bosses 16 via outer brackets 30, respectively. Specifically, each outer bracket 30 is formed of, for example, steel and a base end portion thereof is connected to an end portion (end portion on the side where an upper rear side of the crankcase is mounted) of the second engine suspension boss 16 on the center side in the right and left direction of the vehicle body by means such as welding. Each outer bracket 30 extends rearward along the extending direction of the rear tank rail 15 while being inclined downward. Then, an end portion of the second bridge 29 is connected to a leading end portion of each outer bracket 30 by means such as welding. Further, a pair of inner brackets 31 for connecting link rods 47 of the link mechanism 41 is provided in the intermediate portion, in the right and left direction, of the second bridge 29. Each inner bracket 31 is formed of, for example, steel and a base end portion thereof is fixed to the rear surface side of the second bridge 29 by means such as welding. Further, each inner bracket 31 protrudes rearward and downward along the extending direction of the rear tank rail 15. That is, as seen in the side view of the vehicle, the outer brackets 30, the second bridge 29 and the inner brackets 31 are arranged in this order from the front on an extending line of the rear tank rail 15. Further, a gap between the right and left inner brackets 31 is narrower than a gap between the right and left outer brackets 30. The inner brackets 31 are disposed between the pair of second engine suspension bosses 16 in the right and left direction of the vehicle.

Figure 6:
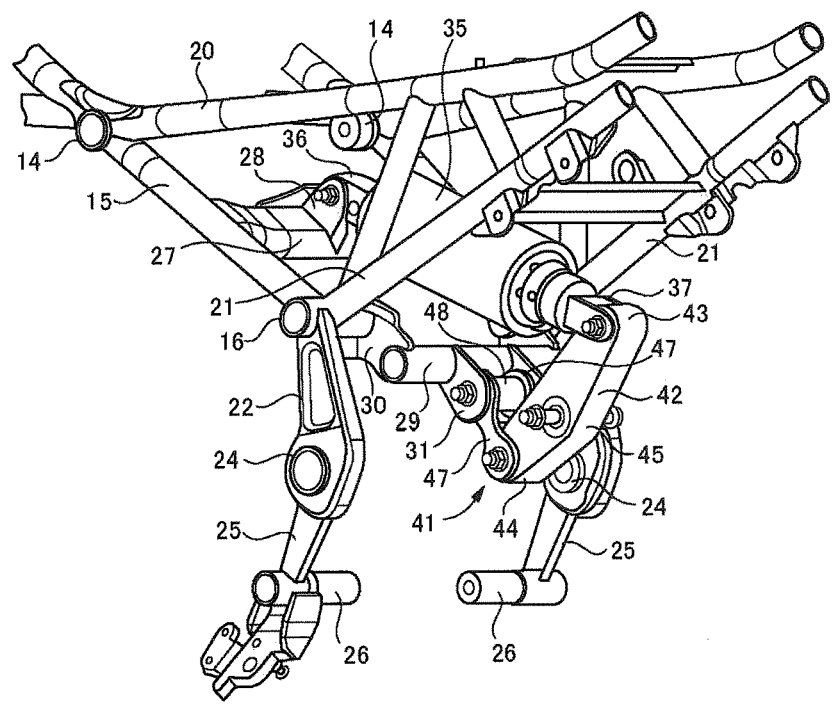
FIG. 6 is an enlarged perspective view showing the rear tank rail, the pivot shaft support, the rear cushion unit and the link mechanism or the like in FIG. 2.
Figure 7:
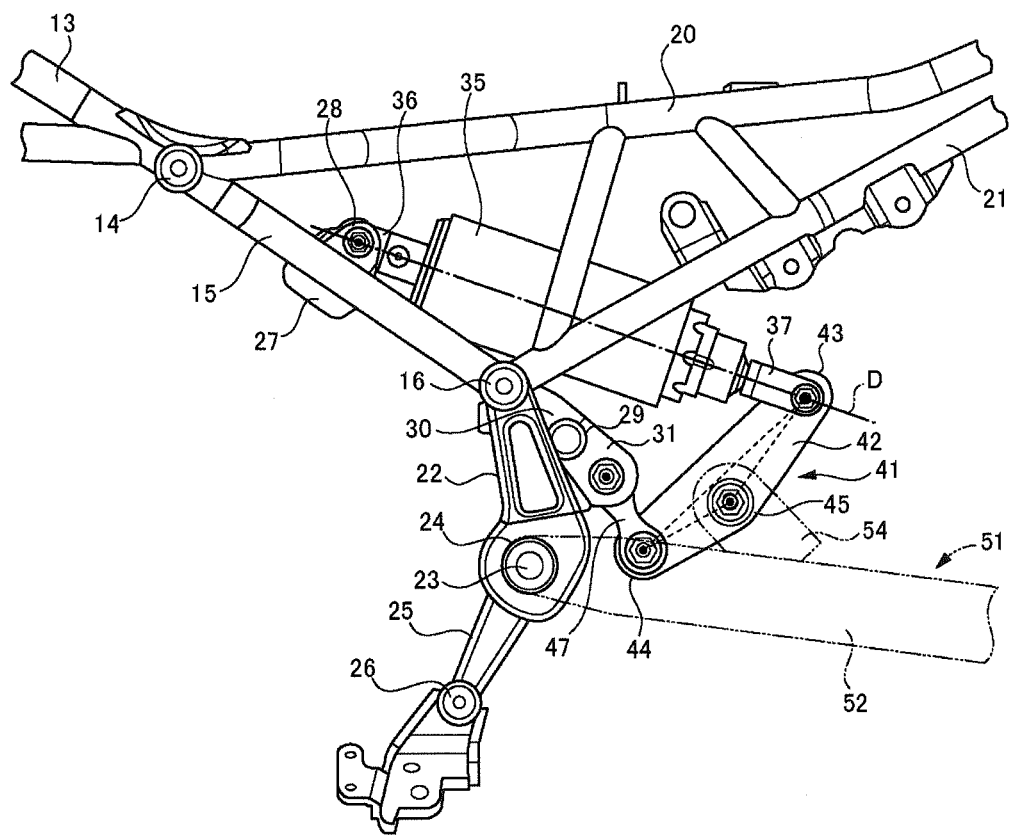
FIG. 7 is an enlarged explanatory view showing the rear tank rail, the pivot shaft support, the rear cushion unit and the link mechanism or the like in FIG. 3.
Figure 8:
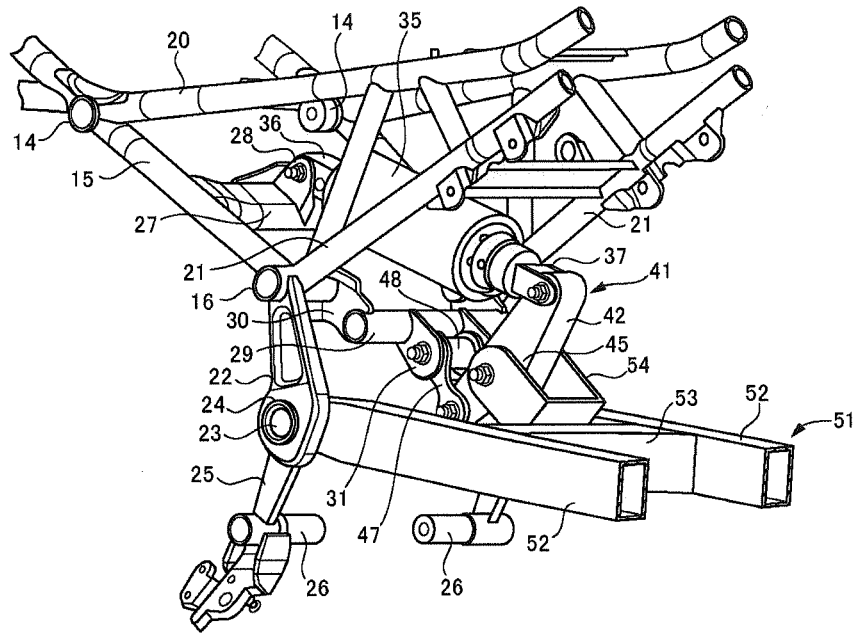
FIG. 8 is an explanatory view showing a state where a swing arm is connected to the pivot shaft support shown in FIG. 6 and the link mechanism is connected to the swing arm.

FIGS. 6 and 7 show an enlarged view of the rear tank rails 15, the pivot shaft supports 24, the rear cushion unit 35, and the link mechanism 41 or the like shown in FIGS. 2 and 3, respectively. FIG. 8 shows a state where the swing arm 51 is connected to the pivot shaft supports 24 shown in FIG. 6 and the link mechanism 41 is connected to the swing arm 51.

As shown in FIG. 6, the saddle-ridden type vehicle 1 includes the rear cushion unit 35 for absorbing impact which is applied to the vehicle body through the rear wheel 6 when the vehicle travels on a road surface having unevenness and the link mechanism 41 for connecting the rear end portion of the rear cushion unit 35 to the swing arm 51 and the second bridge 29.

The rear cushion unit 35 has a known structure which includes a damper having a cylinder, a piston and a piston rod, and a coil spring provided in an outer peripheral side of the damper. Meanwhile, a detailed configuration of the rear cushion unit 35 is not shown (e.g., coil spring is not shown). Further, "D" in FIG. 7 represents an axis of the rear cushion unit 35. The rear cushion unit 35 extends in a direction of the axis D and can extend and retract in the direction of the axis D.

Further, the rear cushion unit 35 is arranged such that the axis D substantially coincides with the longitudinal direction of the saddle-ridden type vehicle 1. Specifically, the rear cushion unit 35 extends in the center, in the right and left direction, of the saddle-ridden type vehicle 1 while being inclined downward from the front portion to the rear portion of the rear cushion unit 35 such that the axis D substantially follows the extending direction of the rear tank rail 15. That is, the rear cushion unit 35 is arranged such that the axis D is substantially parallel to the extending direction of the rear tank rail 15, as seen in the side view of the vehicle (see FIG. 7). Further, the rear cushion unit 35 is arranged such that the axis D coincides with a center line C of the saddle-ridden type vehicle 1 extending in the longitudinal direction, as seen in the plan view of the saddle-ridden type vehicle 1 (see FIG. 4). Specifically, the rear cushion unit 35 is arranged such that it is swung about its front end portion pivotably connected to the vehicle body frame 11 in accordance with the movement of the swing arm 51 but its axis D passes through the first engine suspension boss 14 within its swing range, as seen in the side view of the vehicle.

Further, the front end portion of the rear cushion unit 35 is pivotably connected to the cushion connection brackets 28 provided in the first bridge 27 of the vehicle body frame 11. Specifically, as shown in FIG. 6, the front end portion of the rear cushion unit 35 is swingably connected to the cushion connection brackets 28 by inserting a mounting portion 36 provided in the front end portion of the rear cushion unit 35 into a portion between the cushion connection brackets 28 aligned at the right and left sides on the upper surface of the first bridge 27, inserting, for example, a bolt into a hole formed in the mounting portion 36 and holes formed in respective cushion connection brackets 28, and fastening a nut to the bolt disposed along the right and left direction of the vehicle. Meanwhile, the bolt for connecting the front end portion that is a swinging center of the rear cushion unit 35 is disposed above the rear tank rails 15, as seen in the side view of the vehicle (see FIG. 7).

On the other hand, as shown in FIG. 7, the rear end portion of the rear cushion unit 35 is located at the rear side relative to the rear end portion of each rear tank rail 15. Further, the rear end portion of the rear cushion unit 35 is located at the rear side relative to the outer brackets 30, the second bridge 29 and the inner brackets 31, as seen in the side view of the vehicle.

Further, as a result of arranging the rear cushion unit 35 so as to extend rearward from the first bridge 27 in this way, the whole of the rear cushion unit 35 is located above the swing arm 51. Further, the rear cushion unit 35 is, on the whole, located above the second engine suspension bosses 16, the outer brackets 30, the second bridge 29 and the inner brackets 31, as seen in the side view of the vehicle.

On the other hand, the link mechanism 41 includes a link lever 42 as a first link member for connecting the rear end portion of the rear cushion unit 35 to a lever connection portion 54 provided in the swing arm 51 and a pair of link rods 47 as a second link member for connecting a portion of the link lever 42 to the inner brackets 31 provided in the second bridge 29.

The link lever 42 is formed in a bar shape or a flat shape by a material such as aluminum, for example. In the present embodiment, the link lever 42 is formed in a flat shape having a triangular contour where a connection portion with the rear end portion of the rear cushion unit 35, a connection portion with the lever connection portion 54 and connection portions with the link rods 47 are respectively arranged at a vertex, as seen in the side view of the saddle-ridden type vehicle 1.

A rear cushion unit connection portion 43 is formed in one end portion (i.e., a portion corresponding to one vertex located at the upper side of FIG. 7, out of three vertices of the triangle) of the link lever 42. The rear cushion unit connection portion 43 is swingably connected to the rear end portion of the rear cushion unit 35. Specifically, the rear cushion unit connection portion 43 is swingably connected to the rear end portion of the rear cushion unit 35 by inserting the rear cushion unit connection portion 43 into the inside of a U-shaped mounting portion 37 provided in the rear end portion of the rear cushion unit 35, inserting, for example, a bolt into a hole formed in the rear cushion unit connection portion 43 and holes formed in the mounting portion 37, and fastening a nut to the bolt disposed along the right and left direction of the vehicle. Further, in the present embodiment, the rear cushion unit connection portion 43 is located at the rear side relative to the second engine suspension bosses 16 and the second bridge 29 and at the same height as the second engine suspension bosses 16 and the second bridge 29, as seen in the side view of the vehicle.

On the other hand, a link rod connection portion 44 is formed in the other end portion (i.e., a portion corresponding to one vertex located at the lower side of FIG. 7, out of three vertices of the triangle) of the link lever 42. The link rod connection portion 44 is located at the front and lower side relative to the rear end portion of the rear cushion unit 35 and at the rear side relative to the rear end portion of each rear tank rail 15. Further, in the present embodiment, the link rod connection portion 44 is located above the pivot shafts 23 and at the lower and slightly rear side relative to the inner brackets 31, as seen in the side view of the vehicle. Further, the link rod connection portion 44 is formed narrower than the gap between the right and left inner brackets 31 in the right and left direction of the vehicle.

On the other hand, a swing arm connection portion 45 for connecting the lever connection portion 54 of the swing arm 51 is formed in the portion (i.e., a portion corresponding to one vertex located between the two vertices of three vertices of the triangle) between the one end portion and the other end portion of the link lever 42.

Each link rod 47 is formed in a bar shape or a plate shape by a material such as steel, for example. As shown in FIG. 6, the link rods 47 are provided at the right and left sides across the link rod connection portion 44 of the link lever 42, respectively.

One end portions of respective link rods 47 at the lower side of FIG. 7 are pivotably connected to the link rod connection portion 44 of the link lever 42. Specifically, the one end portions of respective link rods 47 are arranged at both right and left sides of the link rod connection portion 44 and are pivotably connected to the link rod connection portion 44 by interposing the link rod connection portion 44 of the link lever 42 between the one end portions of the pair of link rods 47, inserting, for example, a bolt into holes formed in the one end portions of respective link rods 47 and a hole formed in the link rod connection portion 44, and fastening a nut to the bolt disposed along the right and left direction of the vehicle.

On the other hand, the other end portions of respective link rods 47 at the upper side of FIG. 7 are pivotably connected to the inner brackets 31 provided in the second bridge 29. Specifically, as shown in FIG. 6, the other end portions of respective link rods 47 are pivotably connected to the inner brackets 31 by placing the other end portions of respective link rods 47 between the pair of inner brackets 31 of the second bridge 29, also placing a spacer 48 between the other end portions of the pair of link rods 47, inserting, for example, a bolt into holes formed in the other end portions of respective link rods 47, a hole formed in the spacer 48 and holes formed in respective inner brackets 31, and fastening a nut to the bolt disposed along the right and left direction of the vehicle. Meanwhile, the pair of link rods 47 and the spacer 48 may be integrally formed. In this case, when a bearing is arranged on the inside of the spacer 48, the movement of the link rods 47 can be smoothed and the movement of the swing arm 51 can be improved.

Further, as shown in FIG. 7, each link rod 47 extends to the upper side of the saddle-ridden type vehicle 1 while being inclined forward from the one end portion to the other end portion thereof. In addition, the connection portions between the link rods 47 and the inner brackets 31 of the second bridge 29 are located above the swing arm 51. Further, the lowest portion of the link mechanism 41 is the connection portion (link rod connection portion 44) between the link lever 42 and each link rod 47. This portion enters a front space of a connection portion 53 between the front end portions of right and left arm portions 52 of the swing arm 51 (to be described later) but is located above the lower surface of the swing arm 51. In this way, in the saddle-ridden type vehicle 1 according to the present embodiment, any portion of the link mechanism 41 does not protrude below the lower surface of the swing arm 51.

On the other hand, as shown in FIG. 8, the lever connection portion 54 of the swing arm 51 is pivotably connected to the swing arm connection portion 45 of the link lever 42. That is, the U-shaped lever connection portion 54 as a cushion unit connection portion is provided above the intermediate portion, in the right and left direction, of the connection portion 53 of the swing arm 51. The lever connection portion 54 is pivotably connected to the swing arm connection portion 45 by inserting the swing arm connection portion 45 of the link lever 42 into the inside of the lever connection portion 54, inserting, for example, a bolt into holes formed in the lever connection portion 54 and a hole formed in the swing arm connection portion 45, and fastening a nut to the bolt disposed along the right and left direction of the vehicle.

Here, as shown in FIG. 4, the swing arm 51 is formed by connecting a pair of arm portions 52 which supports a rear wheel axle at its rear end and extends in the longitudinal direction by the connection portion 53 extending in the right and left direction. Further, as shown in FIG. 8, the front end portions of the pair of arm portions 52 of the swing arm 51 are pivotably connected to the pair of pivot shaft supports 24 via the pivot shafts 23, respectively. In this way, the swing arm 51 can be swung in the vertical direction about the pivot shafts 23 as an axis.

In the present embodiment, the front end portions of the arm portions 52 are disposed between the right and left pivot frames 22 and are disposed on both sides of the central portion, in the vertical direction, of the rear portion of the crankcase. That is, the front end portions of the arm portions 52 are disposed between the pivot frames 22 and the rear portion of the crankcase in the right and left direction (the axial direction of the pivot shaft 23) of the vehicle. Meanwhile, the front end portions of the arm portions 52 are positioned by being supported on the pivot shafts 23 via bearings and are pivotally supported so as to be swingable about the axes of the pivot shafts 23.

Here, the pivot shafts 23 are positioned by being inserted and supported in an iron-made cylindrical member cast in the rear portion of the crankcase. Further, the diameters of both end portions of the pivot shafts 23 are set smaller than those of the holes of the pivot shaft supports 24 into which the pivot shafts 23 are inserted. Therefore, the pivot shafts 23 are in the state of being loosely fitted into the holes. In this way, irrespective of the manufacturing precision (especially, the positional precision of each of the right and left pivot shaft supports 24, the relative position precision of the right and left pivot shaft supports 24, and the coaxiality precision of the right and left pivot shaft supports 24) of the vehicle body frame 11, a pivot position (which refers to the posture of the pivot shafts 23 and is parallel to the right and left direction of the vehicle) with high accuracy can be obtained and there is no need to unnecessarily increase the rigidity of the vehicle body frame 11. Further, there is no need to unnecessarily increase the manufacturing precision of the vehicle body frame 11, and the vehicle body frame 11 can be easily manufactured, and thus, the productivity can be improved.

In particular, the vehicle body frame 11 in the present embodiment does not have a cross member for directly connecting the right and left pivot frames 22 and also does not have a cross member for connecting the right and left portions of the vehicle body frame 11 below the right and left pivot frames 22. Further, also in the second engine suspension bosses 16 for connecting the right and left portions of the vehicle body frame 11 above the pivot frames 22, the right and left portions of the vehicle body frame 11 are connected via multiple parts (the right and left outer brackets 30 and the second bridge 29). Therefore, it is difficult to achieve the positional precision required for the right and left pivot shaft supports 24 by the vehicle body frame 11 alone. However, in the present invention, the pivot shafts 23 are positioned by the rear portion of the crankcase and the fixation position of the pivot shafts 23 in the pivot shaft supports 24 is allowed to be adjusted. Accordingly, the assembling precision of the swing arm 51 is improved.

Figure 9:
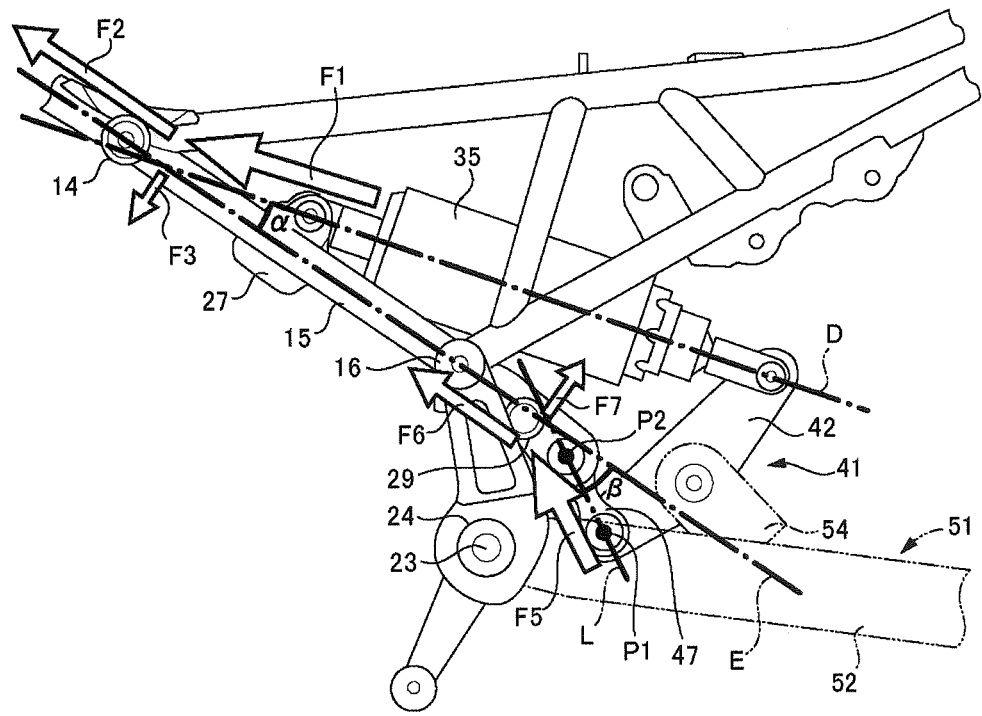
FIG. 9 is an explanatory view showing a positional relation between the rear tank rail and the rear cushion unit and a positional relation between the rear tank rail and a link rod, and the like in the saddle-ridden type vehicle according to the embodiment of the present invention.

FIG. 9 shows a positional relation between the rear tank rails 15 and the rear cushion unit 35 and a positional relation between the rear tank rails 15 and the link rods 47. As shown in FIG. 9, the rear cushion unit 35 is arranged so that an angle α between an extending direction E of each rear tank rail 15 and an extending and retracting direction (i.e., the axis D) of the rear cushion unit 35 is less than 45 degrees, irrespective of the swing angle of the swing arm 51, as seen in the side view of the vehicle. On the other hand, each link rod 47 is arranged so that an angle β between a straight line L and the extending direction E of each rear tank rail 15 is less than 45 degrees, irrespective of the swing angle of the swing arm 51. Here, the straight line L is obtained by connecting a connection point P1 between the one end portion of the link lever 42 and the link rod 47 and a connection point P2 between the other end portion of the link rod 47 and the inner bracket 31 of the second bridge 29. At this time, in the case of having the state where a straight line connecting the second engine suspension boss 16 and the connection point P2 and the straight line L are overlapped in a straight line, the force applied to the link rod 47 can be effectively transmitted to the second engine suspension boss 16 and the rear portion of the crankcase.

Figure 10:
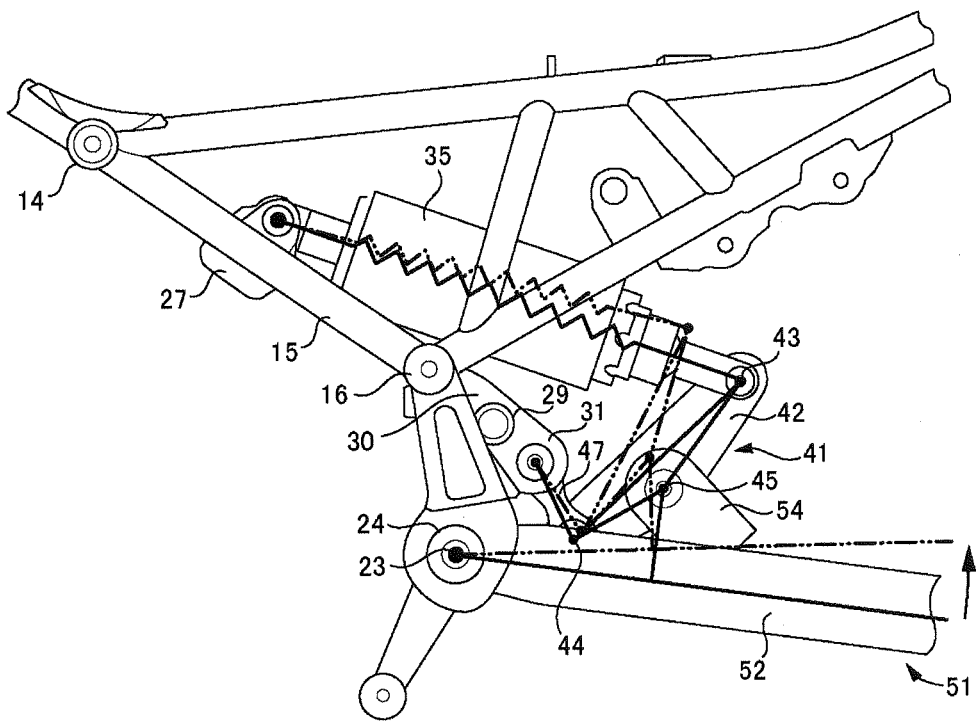
FIG. 10 is an explanatory view showing an operation of the rear cushion unit and the link mechanism in the saddle-ridden type vehicle according to the embodiment of the present invention.

FIG. 10 shows an operation of the rear cushion unit 35 and the link mechanism 41. Namely, the thick solid line in FIG. 10 indicates positions of the swing arm 51, the rear cushion unit 35 and the link mechanism 41 when the saddle-ridden type vehicle 1 is stopped on a horizontal ground in the state where a driver sits on the seat 8, for example. On the other hand, the two-dot chain line in FIG. 10 indicates positions of the swing arm 51, the rear cushion unit 35 and the link mechanism 41 at the moment when the rear wheel 6 rides on a convex portion formed on a road surface while the saddle-ridden type vehicle 1 is travelling, for example. When the rear wheel 6 rides on the convex portion formed on the road surface while the saddle-ridden type vehicle 1 is travelling, each arm portion 52 of the swing arm 51 is pivoted in a counter-clockwise direction in FIG. 10 about the pivot shaft 23 as an axis, so that the rear end side of each arm portion 52 moves upward. Along with this, the connecting shaft center (bolt shaft center) between the lever connection portion 54 of the swing arm 51 and the swing arm connection portion 45 of the link lever 42 moves upward while moving forward so that the connecting shaft center draws an arc. Along with this, the connecting shaft center (bolt shaft center) between the link rod connection portion 44 of the link lever 42 and the one end portion (lower end portion) of the link rod 47 moves. However, the range of the movement is restricted on the trajectory drawn by the one end portion of the link rod 47 which is pivoted with respect to the inner bracket 31. As a result, with the movement of the swing arm connection portion 45 of the link lever 42, the rear cushion unit connection portion 43 of the link lever 42 moves forward and pushes the rear end portion of the rear cushion unit 35 forward against an elastic force of the coil spring of the rear cushion unit. In response to this, the rear cushion unit 35 retracts.

Further, as can be seen by comparing the thick solid line and the two-dot chain line in FIG. 10, when the rear end portions of the arm portions 52 of the swing arm 51 are moved upward, an angle between the extending and retracting direction of the rear cushion unit 35 and the extending direction of the rear tank rails 15 increases. This point will be described in detail with reference to FIG. 9. When the rear end portions of the arm portions 52 of the swing arm 51 are located below, the angle α between the extending and retracting direction (the axis D) of the rear cushion unit 35 and the extending direction E of the rear tank rails 15 decreases and approaches zero. That is, when the rear end portions of the arm portions 52 of the swing arm 51 are located below, the positional relation between the extending and retracting direction of the rear cushion unit 35 and the extending direction E of the rear tank rails 15 is made close to the parallel positional relation. On the other hand, when the rear end portions of the arm portions 52 of the swing arm 51 are moved upward, the angle α between the extending and retracting direction of the rear cushion unit 35 and the extending direction E of the rear tank rails 15 increases. However, even when the rear end portions of the arm portions 52 of the swing arm 51 are moved to the highest position, the angle α does not exceed 45 degrees.

Further, as can be seen by comparing the thick solid line and the two-dot chain line in FIG. 10, when the rear end portions of the arm portions 52 of the swing arm 51 are moved upward, an angle between the extending and retracting direction of the link rods 47 and the extending direction of the rear tank rails 15 decreases. This point will be described in detail with reference to FIG. 9. When the rear end portions of the arm portions 52 of the swing arm 51 are located below, the angle β between the extending and retracting direction (straight line L connecting the connection points P1 and P2) of the link rod 47 and the extending direction E of the rear tank rails 15 increases. However, even when the rear end portions of the arm portions 52 of the swing arm 51 are moved to the lowest position, the angle β does not exceed 45 degrees. On the other hand, when the rear end portions of the arm portions 52 of the swing arm 51 are moved upward, the angle β between the extending and retracting direction of the link rods 47 and the extending direction E of the rear tank rails 15 decreases and approaches zero. In this case, when the angle β becomes zero, the connection point P1, the connection point P2, the second engine suspension boss 16 and the first engine suspension boss 14 are arranged in a straight line. As the rear end portions of the arm portions 52 of the swing arm 51 are moved upward, the positional relation among the connection point P1, the connection point P2, the second engine suspension boss 16 and the first engine suspension boss 14 is made close to the positional relation of the straight line arrangement.

Further, as shown in FIG. 9, a load, which occurs when the rear wheel 6 rides on the convex portion formed on the road surface while the saddle-ridden type vehicle 1 is travelling, for example, and thus, the swing arm 51 moves upward, is applied from the swing arm 51 to the rear cushion unit 35 through the link lever 42. Then, the load applied to the rear cushion unit 35 is applied to each rear tank rail 15 via the rear cushion unit 35 and the first bridge 27. At this time, since the angle α between the extending and retracting direction (the axis D) of the rear cushion unit 35 and the extending direction E of the rear tank rails 15 is less than 45 degrees, of a force F1 applied to each rear tank rail 15 via the rear cushion unit 35 and the first bridge 27, a component force F2 applied to each rear tank rail 15 in the extending direction E of each rear tank rail 15 is made larger than a component force F3 applied to each rear tank rail 15 in a direction perpendicular to the extending direction E of each rear tank rail 15. In this way, the load occurring when the swing arm 51 moves upward is transmitted to the first bridge 27 via the rear cushion unit 35. Then, this load is received by each rear tank rail 15 whose front end portion is fixed to the rear side of the cylinder head by each first engine suspension boss 14 and whose rear end portion is fixed to the rear side of the crankcase by each second engine suspension boss 16. In this way, the load can be efficiently received by the rear tank rails 15.

Further, the load, which occurs when the rear wheel 6 rides on the convex portion formed on the road surface while the saddle-ridden type vehicle 1 is travelling, for example, and thus, the swing arm 51 moves upward, is also applied from the swing arm 51 to the link rods 47 through the link lever 42. Then, the load applied to the link rods 47 is applied to each rear tank rail 15 via the link rods 47 and the second bridge 29. At this time, since the angle β between the extending direction (the straight line L connecting the connection points P1 and P2) of each link rod 47 and the extending direction E of each rear tank rail 15 is less than 45 degrees, of a force F5 applied to each rear tank rail 15 via the link rods 47 and the second bridge 29, a component force F6 applied to each rear tank rail 15 in the extending direction E of each rear tank rail 15 becomes larger than a component force F7 applied to each rear tank rail 15 in a direction perpendicular to the extending direction E of each rear tank rail 15. In this way, the load occurring when the swing arm 51 moves upward is transmitted to the second engine suspension bosses 16 via the link rods 47, the inner brackets 31, the second bridge 29 and the outer brackets 30, and is received by the rear tank rails 15 and the rear portion of the crankcase. As a result, the load can be efficiently received by the rear tank rails 15 and the rear portion of the crankcase. In particular, since the outer brackets 30 are arranged closer to the crankcase relative to the rear tank rails 15 in a vehicle width direction of each second engine suspension boss 16, the load can be efficiently received by the rear portion of the crankcase which is more rigid.

In this way, according to the positional relation between each rear tank rail 15 and the rear cushion unit 35 and the positional relation between each rear tank rail 15 and each link rod 47 in the saddle-ridden type vehicle 1, the load occurring when the swing arm 51 moves upward is concentrated in a direction of pushing each rear tank rail 15 in its extending direction. That is, most of the load occurring when the swing arm 51 moves upward becomes a force of pushing the rear tank rails 15 from the rear side toward the front side along its extending direction.

Further, the load occurring when the rear end sides of the arm portions 52 of the swing arm 51 move upward is applied to the front tank rails 13 or the cylinder head via the rear tank rails 15. As shown in FIG. 3, each front tank rail 13 linearly extends in the same direction as the rear tank rail 15, as seen in the side view of the saddle-ridden type vehicle 1. Further, as shown in FIG. 4, the rear end side of each front tank rail 13 linearly extends in the same direction as the rear tank rail 15 but the front end side thereof is curved in the right and left direction, as seen in the plan view of the saddle-ridden type vehicle 1. However, this curvature is gentle. Further, the side frames 19 and the auxiliary frames 61, 62 are disposed at the front side of each first engine suspension boss 14, thereby reinforcing the vehicle body frame. Therefore, the load, which is applied to the front tank rails 13 through the rear tank rails 15 when the rear end sides of the arm portions 52 of the swing arm 51 move upward, is applied in a direction of pushing each front tank rail 13 from the rear side toward the front side along its extending direction. Further, the load applied to the front tank rails 13 is applied to the head pipe 12. Since the front end portion of each front tank rail 13 is connected to the rear surface side of the head pipe 12, the load is applied to the rear surface side of the head pipe 12.

As described above, according to the saddle-ridden type vehicle 1 of the embodiment of the present invention, the rear cushion unit 35 is located above the swing arm 51 and the link mechanism 41 is located above the lower surface of the swing arm 51. Therefore, a large space that can be used for arrangement of components can be easily formed below the front end side of the swing arm 51. In this way, as shown in FIG. 3, a large exhaust chamber 9 can be arranged below the front end side of the swing arm 51, thereby improving the exhaust performance of the vehicle.

Further, according to the saddle-ridden type vehicle 1 of the embodiment of the present invention, the load, which occurs when the rear wheel 6 rides on the convex portion of the road surface, for example, and thus, the rear end side of each arm portion 52 of the swing arm 51 moves upward, can be concentrated in a direction of pushing each rear tank rail 15 in its extending direction. Since each rear tank rail 15 linearly extends, the rigidity for the pushing force in the extending direction is high. Therefore, it is possible to fully counter the load even without thickening the rear tank rails 15 and thus increasing the bending rigidity thereof. Thus, it is possible to reduce the weight of the rear tank rails 15. Further, even without adding a reinforcing member, for example, between the rear tank rails 15 and the upper seat rails 20 in order to prevent the bending deformation of the rear tank rails 15, it is possible to prevent the rear tank rails 15 from being bent and deformed by the load. Therefore, it is possible to reduce the weight of the vehicle body frame 11 by reducing the number of parts constituting the vehicle body frame 11 while securing the rigidity of the vehicle body frame 11.

Further, the load, which is applied to the rear tank rails 15 when the rear end side of each arm portion 52 of the swing arm 51 moves upward, is applied to the front tank rails 13 so as to push the front tank rails 13 in its extending direction and also is applied to the rear surface side of the head pipe 12 through the front tank rails 13. In this way, similar to the rear tank rails 15, it is possible to fully counter the load even without increasing the bending rigidity of the front tank rails 13. Therefore, it is possible to reduce the weight of the front tank rails 13, and also, it is possible to reduce the number of the members for reinforcing the front tank rails 13, thereby reducing the weight of the vehicle body frame 11.

Further, in the saddle-ridden type vehicle 1 according to the embodiment of the present invention, the second bridge 29 to which the link rods 47 are connected is bridged between the second engine suspension bosses 16 respectively provided in the rear end portions of the pair of rear tank rails 15. Specifically, the second bridge 29 is arranged at a position deviated rearward from the space between the second engine suspension bosses 16 via the pair of outer brackets 30. In this way, a portion of the crankcase of the engine 2 is fixed by being interposed between the second engine suspension bosses 16. With this structure, a portion of the load, which is applied to each rear tank rail 15 via the link lever 42, the link rods 47 and the second bridge 29 when the swing arm 51 moves upward, can be received by the crankcase of the engine 2. Therefore, it is possible to counter the load even without increasing the rigidity of each rear tank rail 15, and thus, it is possible to reduce the weight of each rear tank rail 15.

Further, according to the saddle-ridden type vehicle 1 of the embodiment of the present invention, there is no need to make the frame structure below the pivot shaft support robust, unlike the saddle-ridden type vehicle disclosed in the Patent Document 2. Therefore, it is possible to reduce the weight of the vehicle body frame 11. That is, in the saddle-ridden type vehicle disclosed in the Patent Document 2, the lower end portion of the tie rod constituting a portion of the link mechanism is connected to the lower end portion of the swing arm bracket portion extending downwardly from the pivot shaft support. As a result, the load occurring when the swing arm moves upward is applied to the lower end portion of the swing arm bracket portion via the tie rod. Therefore, the rigidity of the swing arm bracket portion must be increased in order to counter the load. On the contrary, in the saddle-ridden type vehicle 1 according to the embodiment of the present invention, the other end portion of each link rod 47 is connected to each inner bracket 31 of the second bridge 29. In this way, the load occurring when the swing arm 51 moves upward is applied in a direction of pushing each rear tank rail 15 in its extending direction via the link lever 42, the link rods 47 and the second bridge 29. Therefore, the load is not applied to each lower bracket 25 provided below each pivot shaft support 24, and thus, there is no need to increase the rigidity of each lower bracket 25 in order to counter the load. As a result, it is possible to reduce the weight of the vehicle body frame 11.

Further, according to the saddle-ridden type vehicle 1 of the embodiment of the present invention, the rear tank rail 15, the lower seat rail 21 and the pivot frame 22 are collectively connected to each second engine suspension boss 16. Therefore, the load respectively applied to the rear tank rail 15, the lower seat rail 21 and the pivot frame 22 can be received by the crankcase of the engine 2 connected between the second engine suspension bosses 16. In this way, even when the number of members for reinforcing the frame is reduced, it is possible to secure the sufficient frame rigidity, and thus, it is possible to reduce the weight of the vehicle body frame 11.

Meanwhile, the present invention is applicable to a saddle-ridden type vehicle having various types of vehicle body frames. For example, the present invention is not limited to the diamond frame as described in the above embodiments but is also applicable to a cradle frame or a box frame or the like. Further, the present invention is also applicable to a vehicle body frame made of aluminum. Furthermore, the present invention is also applicable to other types of saddle-ridden type vehicles other than the motorcycle.

Further, the present invention can be properly modified without departing from the gist or spirit of the invention that can be read from the claims and the entire specifications. Further, the saddle-ridden type vehicle with such modifications is also included in the technical scope of the present invention.

What is claimed is:

1. A saddle-ridden vehicle comprising:
   a pair of right and left frame members each extending linearly in a longitudinal direction;
   a pivot shaft support located below a rear end portion of each of the frame members;
   a swing arm extending in the longitudinal direction and having a front end portion pivotably supported on each pivot shaft support via a pivot shaft, a rear end portion on which a rear wheel is supported, and a cushion unit connection portion located between the front end portion and the rear end portion;
   a first support member located at a front side relative to the rear end portion of each of the frame members and bridged between the frame members;
   a second support member bridged between the rear end portions of the frame members;
   a rear cushion unit being extendable and retractable in the longitudinal direction and having a front end portion pivotably connected to the first support member and a rear end portion located at a rear side relative to the rear end portion of each of the frame members; and
   a link mechanism for connecting the rear end portion of the rear cushion unit and the cushion unit connection portion of the swing arm,
   wherein the link mechanism comprises:
      a first link member which has one end portion pivotably connected to the rear end portion of the rear cushion unit, the other end portion located at a front lower side relative to the rear end portion of the rear cushion unit and extending to a position at the rear side relative to the rear end portion of each of the frame members, and a swing arm connection portion located between the one end portion and the other end portion; and
      a second link member which has one end portion pivotably connected to the other end portion of the first link member and the other end portion pivotably connected to the second support member,
   wherein the cushion unit connection portion of the swing arm is pivotably connected to the swing arm connection portion of the first link member, and
   wherein bosses for suspending an engine between the frame members are respectively provided in the rear end portions of the frame members, and the second support member is bridged between the bosses.

2. The saddle-ridden vehicle according to claim 1, wherein a connection portion between the second link member and the second support member is located above the swing arm.

3. The saddle-ridden vehicle according to claim 1, wherein the rear cushion unit is provided so that an angle between an extending and retracting direction thereof and an extending direction of each of the frame members is less than 45 degrees, irrespective of a swing angle of the swing arm.

4. The saddle-ridden vehicle according to claim 1, wherein the second link member is provided so that an angle between a straight line and an extending direction of each of the frame members is less than 45 degrees, irrespective of a swing angle of the swing arm, the straight line being obtained by connecting a connection point between the first link member and the second link member and a connection point between the second link member and the second support member.

* * * * *